(12) United States Patent
Haro

(10) Patent No.: US 9,426,769 B2
(45) Date of Patent: Aug. 23, 2016

(54) METHOD AND APPARATUS FOR DETERMINING A GEO-LOCATION CORRECTION-OFFSET

(71) Applicant: HERE Global B.V., Veldhoven (NL)

(72) Inventor: Antonio Haro, Hercules, CA (US)

(73) Assignee: HERE GLOBAL B.V., Veldhoven (NL)

( * ) Notice: Subject to any disclaimer, the term of this patent is extended or adjusted under 35 U.S.C. 154(b) by 117 days.

(21) Appl. No.: 14/093,254

(22) Filed: Nov. 29, 2013

(65) Prior Publication Data

US 2015/0156744 A1 Jun. 4, 2015

(51) Int. Cl.
*H04W 24/00* (2009.01)
*H04W 64/00* (2009.01)
*H04W 4/02* (2009.01)

(52) U.S. Cl.
CPC .............. *H04W 64/00* (2013.01); *H04W 4/021* (2013.01)

(58) Field of Classification Search
CPC ...................... H04W 4/00; H04W 4/02–4/046; H04W 40/20; H04W 40/205; H04W 64/00; H04W 64/003; H04W 64/006
USPC .................. 370/310.2, 338; 455/404.1, 414.1, 455/456.1–456.6, 457, 414.2
See application file for complete search history.

(56) References Cited

U.S. PATENT DOCUMENTS

| 6,697,016 | B1 * | 2/2004 | Voor ...................... G01S 19/235 342/357.62 |
| 8,165,798 | B2 | 4/2012 | Woo |
| 8,442,716 | B2 | 5/2013 | Epshtein et al. |
| 2012/0052883 | A1 * | 3/2012 | Austin .................. G01S 5/0063 455/456.6 |
| 2012/0310968 | A1 | 12/2012 | Tseng |

FOREIGN PATENT DOCUMENTS

CN 103177189 A 6/2013

OTHER PUBLICATIONS

Shaw, B., et al. "Learning to Rank for Spatiotemporal Search." <http://www.metablake.com/foursquare/wsdm2013-final.pdf > Publication Date: Feb. 4-8, 2012.
Oku, K., et al. "Method for Making Temporal Features of POIs for Geographical Recommendation." < http://e-zerde.kz/kobe/papers/short/413.pdf > Publication Date: Nov. 20-24, 2012.

* cited by examiner

*Primary Examiner* — Steve D Agosta
(74) *Attorney, Agent, or Firm* — Ditthavong & Steiner, P.C.

(57) ABSTRACT

An approach is provided to process communication information for determining a possible correction-offset to location information of a user. A location verification platform may process and/or facilitate a processing of communication information associated with at least one user device. The location verification platform may also determine a current geo-location of the at least one user device based, at least in part, on the communication information. Further, the location verification platform may determine an accuracy of the current geo-location based, at least in part, on a comparison of the current geo-location with contextual location information associated with the current geo-location. Furthermore, the location verification platform may determine a correction-offset to the current geo-location based, at least in part, on an accuracy threshold.

12 Claims, 13 Drawing Sheets

METHOD AND APPARATUS FOR DETERMINING A GEO-LOCATION CORRECTION-OFFSET

BACKGROUND

Service providers and device manufacturers (e.g., wireless, cellular, etc.) are continually challenged to deliver value and convenience to consumers by, for example, providing compelling network services. One area of interest has been providing location-based services (e.g., via mobile phone, tablets, in-vehicle systems, etc.) associated with different geo-locations and points of interest (POIs) that users may be at, may be interested in, may be communicating about, or the like. For example, a digital map on a smart phone may illustrate a view of the user's current location and POIs while providing information about or navigation directions to that POI. In another scenario, service providers may track the user's location and provide updates to the user's location based on the location information determined from the user device. However, in certain situations, location information of the user determined from the user device may not be accurate or may not be indicative of the user's current location. Accordingly, service providers and device manufacturers face significant technical challenges to determining accurate current location information of users.

SOME EXAMPLE EMBODIMENTS

Therefore, there is a need for an approach to efficiently and accurately process communication information from a user device for determining a possible correction-offset to location information of the user device.

According to one embodiment, a method comprises processing and/or facilitate a processing of communication information associated with at least one user device. The method also comprises determining a current geo-location of the at least one user device based, at least in part, on the communication information. Further, the method comprises determining an accuracy of the current geo-location based, at least in part, on a comparison of the current geo-location with contextual location information associated with the current geo-location. Additionally, the method comprises determining a correction-offset to the current geo-location based, at least in part, on an accuracy threshold.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of communication information associated with at least one user device. The apparatus is also caused to determine a current geo-location of the at least one user device based, at least in part, on the communication information. Further, the apparatus is caused to determine an accuracy of the current geo-location based, at least in part, on a comparison of the current geo-location with contextual location information associated with the current geo-location. Additionally, the apparatus is caused to determine a correction-offset to the current geo-location based, at least in part, on an accuracy threshold.

According to another embodiment, a computer-readable storage medium carries one or more sequences of one or more instructions which, when executed by one or more processors, cause, at least in part, the apparatus to process and/or facilitate a processing of communication information associated with at least one user device. The apparatus is also caused to determine a current geo-location of the at least one user device based, at least in part, on the communication information. Further, the apparatus is caused to determine an accuracy of the current geo-location based, at least in part, on a comparison of the current geo-location with contextual location information associated with the current geo-location. Additionally, the apparatus is caused to determine a correction-offset to the current geo-location based, at least in part, on an accuracy threshold.

According to another embodiment, an apparatus comprises means for processing and/or facilitate a processing of communication information associated with at least one user device. The apparatus also comprises means for determining a current geo-location of the at least one user device based, at least in part, on the communication information. Further, the apparatus comprises means for determining an accuracy of the current geo-location based, at least in part, on a comparison of the current geo-location with contextual location information associated with the current geo-location. Additionally, the apparatus comprises means for determining a correction-offset to the current geo-location based, at least in part, on an accuracy threshold.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program to efficiently and accurately process communication information from a user device for determining a possible correction-offset to location information of the user device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
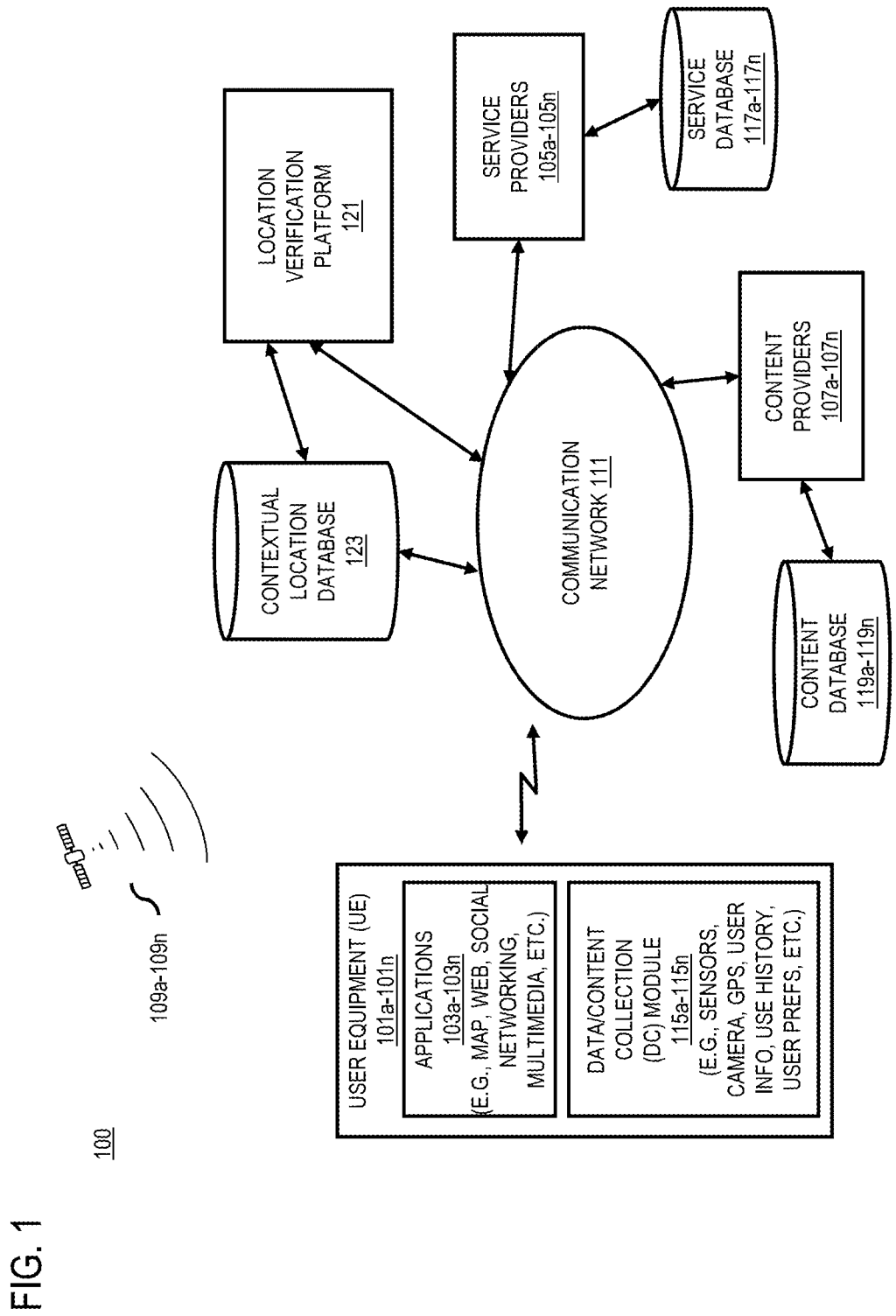
FIG. 1 is a diagram of a system capable of efficiently and accurately processing communication information from a user device for determining a possible correction-offset to location information of the user device, according to an embodiment.

FIG. 1 is a diagram of a system capable of efficient and accurate processing of communication information from a user device for determining a possible correction-offset to location information of the user device, according to an embodiment. As previously discussed, one area of interest among service providers and device manufacturers has been accurate and efficient collection and processing of geo-location (location) data associated with a user (e.g., via a user device) and providing potential location-based services to the user. For example, to provide navigation assistance, digital maps, location-based inquiries, automatic navigation vehicles, or the like may depend on accurate geo-location data of the user. In various scenarios, a service provider may determine the user location via location information provided by a user device, which may be based on raw location information including GPS data, cellular triangulation measurements, or the like. Additionally, the location information may be determined by analyzing communication information from a user device, which may include content associated with one or more POIs. For instance, the communication information from a user device may include content, e.g., a media item (e.g., photo, video, audio, etc.), a text message, a voice message, or the like, which may include references to a POI. Also, a content item may include or may be associated with metadata that may include location information where the content item was captured or created. For example, a file of a digital picture captured at a user device (e.g., a mobile phone) may include location information, time, date, POI, user information, or the like.

However, there are situation when the location information may not be accurate or may not be available at all, which may be due to a variety of factors. Some technologies may be sensitive to signal interference in "urban canyons" (e.g., many large/tall buildings) or require line of sight/connectivity to access points or satellites, where a user device may not be able to accurately acquire or transmit its location information due to an interference in the signaling between the user device and source of the location information. Additionally, a user may post/upload a content item associated with a certain POI sometime after the user has moved away from the location of that POI. For example, the user may send a message including a digital image of the POI Statue of Liberty to a friend indicating that the user is visiting the POI; however, the user may be at a different location (e.g., in New York City) than the location of the POI by the time he is initiating the message. Therefore, there is a need for efficient and accurate processing of communication information from a user device for determining a possible correction-offset to location information of the user device.

To address this problem, a system 100 of FIG. 1 introduces the capability to efficiently and accurately process communication information from a user device for determining a possible correction-offset to location information of the user device. More specifically, the system 100 may process and utilize communication information transmitted by a user device to determine geo-location of the user device. In various scenarios, the communication information may be initiated by a user or by the user device. For example, the user may post a message, e.g., including media or text, to one or more social network sites, or the user device may initiate a predetermined communication signaling (e.g., communication channel signals) with one or more service providers.

In one embodiment, content of a communication message from a user device may be processed to determine location information, possible POIs, or the like, which may be included in metadata associated with the content. For example, a digital image file may include the location information where the image was captured, received, created, or the like. In one embodiment, communication information from a user device may be received by one service provider and then shared with one or more other service providers that may process and utilize the communication information. For example, a communications service provider may receive a message from a user device intended for a certain recipient, and then according to a user agreement, the service provider may provide that message to second service provider, for example, so that the second service provider may provide location tracking or location correction services.

In one embodiment, the location information associated with the user device may be determined from probe data, which, for instance, may include geo-location information (e.g., geographic coordinates, heading, speed, etc.) recorded by the user device and transmitted to the system 100. In some cases, the probe data is collected from user devices that have agreed to or opted into a probe data collection program offered by one or more service providers. In some embodiments, the system 100 may obtain the location information via other means such as network triangulation or usage. For example, the system 100 can determine the number of devices connected to a WiFi network with a known location or the number of devices in a communication cell of a cellular network. In one embodiment, various user generated content items may include postings or communications exchanged within one or more social networks where the content and the related information may then be parsed or mined to determine whether they are related to or mention specific POIs, events, regions, etc., which may then be utilized to determine additional location information associated with a user device.

In certain scenarios, the system 100 may determine that the location information determined from communication information of a user device does not match the current/actual location of the user device. For example, content of a communication message may suggest that the user device is located at a certain geo-location (e.g., a certain City Center); however, location information received from the user device (e.g., GPS coordinates) may indicate that the user device's geo-location is different than what is suggested in the communication message. In one embodiment, the system 100 may determine a disparity between current/actual location of a user device and the location information determined from communication information received from the user device, and then determine a correction-offset.

In one scenario, the system 100 may have access to contextual location information indicating that location information received from user devices in a certain geo-location area may be erroneous, which may be due to poor signaling, inaccurate location information, no location information, or the like. In one embodiment, the system 100 may determine a predefined correction-offset parameters (e.g., GPS coordinates) or a correction-offset function, which may be utilized to determine a more precise location information of the user device. In one example, contextual location information associated with a certain city center area may indicate that location information received from user devices located in the city center area may include one or more parameters that are erroneous (e.g., one block off in a westerly direction).

In one embodiment, the system 100 may determine a correction-offset function, which may be used to determine a corrected location information of a user device, wherein the function may be utilized by one or more elements of the system 100. For example, a correction-offset function may be utilized by a user device to determine a corrected location of the user device.

In one embodiment, the system 100 may process and/or facilitate a processing of communication information associated with at least one user device. In various scenarios, the communication information may be based on a phone call, a message, a transfer of content, user device information, user information, or the like which may be initiated by a user of the user device or one or more applications/modules at the user device. For example, the communication information may be based on a user uploading a media file or a message to a social network site. In various embodiments, the communication information includes active, passive, direct, indirect, or a combination thereof communication information originating, at least in part, from the at least one user device. In one scenario, active communication information may be included in a communication session (e.g., a phone call, a content upload or download, etc.) initiated by a user or a user device, where the communication may be with another user or one or more service providers in the system 100. In another scenario, passive communication information may be included in a communication session/message initiated by the user or the user device where the information is transmitted or received in the background by one or more applications or modules of the user device. In one example, a user device periodically may transmit or receive various signals associated with a communication channel utilized by the user device. In one scenario, a service provider may request or receive the communication information directly from a user device, and in another scenario, the service provider may request or receive the communication information indirectly via one or more other service providers that may have access to the communication information of a user device.

In one embodiment, the system 100 may determine a current geo-location of the at least one user device based, at least in part, on the communication information. In one embodiment, the system 100 may utilize one or more algorithms to parse, process, and analyze the communication information to determine potential location information of the user device. For example, a media file may be processed to determine an included image, video, or audio content item that may be associated with a POI or a certain geo-location, which may be used to determine location information of the user device. In one example, the communication information may include textual content which may be analyzed to determine any references to a POI or a certain geo-location. For instance, a social network post from a user device may include a picture of the Eiffel Tower in Paris, France and a textual message indicating that the user is visiting the Eiffel Tower. In another example, the communication information may include additional location information (e.g., GPS coordinates) reported by a map application at the user device.

In one embodiment, the system 100 may determine an accuracy of the current geo-location based, at least in part, on a comparison of the current geo-location with contextual location information associated with the current geo-location. In one scenario, the system 100 may determine and compare the current location of a user device with contextual location information available from one or more contextual databases in order to evaluate the accuracy of the current location of the user device determined from the communication information. For instance, the system 100 may have determined that the user device is currently at a certain geo-location, and then that certain location information may be compared to contextual location information in one or more contextual databases to ascertain if there are any known issues with location information associated with that certain geo-location. In one instance, a contextual database may include information about a given geo-location or area, e.g., known POIs, GPS coordinates, physical addresses, known errors in determining or reporting location information of devices, and the like. In one embodiment, location information determined from the communication information may be compared to other location information included in the communication information. In one scenario, the system 100 may have detected an image or text in a communication information, which may be associated with a certain POI and based on that POI, a current geo-location is determined for the user device. However, actual location information (e.g., GPS coordinates, cellular tower information, etc.) from the user device may indicate that the user device is at a different location than the one the system 100 has determined based on the POI location information. For example, a user may post a message to a social network site (including a picture) that the user is visiting the Metropolitan Museum of Arts in New York City; however, the user may be posting that message when he is already at a different location and is away from the Museum's location. In this case, the location information determined from the message (e.g., the Museum location) would be different than the actual location information provided by the user device (e.g. GPS coordinates). In one embodiment, the contextual location information includes one or more validated contextual location information data/information items associated with one or more points of interest associated with the current geo-location, a corrected current geo-location, or a combination thereof. For example, the contextual location information may be validated based on information available from a plurality of user devices associated with a certain geo-location, or the contextual location information may be validated by one or more service providers that may collect and verify the contextual location information available in various databases.

In one embodiment, the system 100 may determine a correction-offset to the current geo-location based, at least in part, on an accuracy threshold. In one embodiment, an accuracy threshold may indicate a geographical area in relation to a current location of a user device, wherein a correction-offset to the current location of the user device should be determined. For example, a user profile at a user device or at a service provider may indicate that a correction-offset should be determined/calculated if the location information of the user device indicates an error of more than 200 meters. In various embodiments, the accuracy threshold may be determined based on geographical area of the user device, activity of the user, time of day, resources status at the user device, confidence level of location contextual location information available in one or more databases, or the like.

In one embodiment, the system 100 may cause, at least in part, a transmission of the correction-offset to the at least one user device, one or more databases, or a combination thereof. In one embodiment, a correction-offset may be transmitted to a user device, wherein one or more applications or modules at the user device may utilize the correction-offset to determine a corrected current geo-location for the user device. In one embodiment, the correction-offset for a particular geo-location may be transmitted to one or more databases, wherein contextual location information of that particular geo-location may be corrected, for example, for future use by one or more service providers or one or more user devices.

In one embodiment, the system 100 may cause, at least in part, a transmission of the correction-offset to the at least one user device based, at least in part, on the current geo-location. In one embodiment, a correction-offset may be transmitted to a user device if the user device is near or is at a certain geo-location. For instance, a user profile or a user device configuration may indicate that a correction-offset should be sent to the user device only when the user device is at a certain geo-location. In one scenario, a user may wish to receive a location correction-offset when at a different area than his home area since he may be unfamiliar with the area and require accurate location information.

In one embodiment, the system 100 may cause, at least in part, an update to the current geo-location based, at least in part, on one or more correction-offsets in one or more data lists. In one embodiment, a service provider may determine that there are one or more correction-offsets associated with a current geo-location of a user device, wherein the correction-offsets may be analyzed and an update may be transmitted to the user device. For example, a service provider may determine a current geo-location of the user device, and then further determine that there are various correction-offsets available in one or more databases or data lists. In one embodiment, a service provider may determine to select from the one or more correction-offsets a best correction-offset for transmission to a user device. For example, the service provider may select a correction-offset from a database or a data list that has been validated or that has a high confidence level of accuracy.

In one embodiment, the system 100 may cause, at least in part, a presentation of a corrected current geo-location at the at least one user device. In one scenario, a service provider may cause one or more applications or modules at a user device to present a corrected current geo-location at a user device, wherein the corrected current geo-location may be based on a correction-offset determined from one or more databases or data lists. For example, after determining a correction-offset for a current geo-location of a user device, the service provider may transmit one or more commands to an application at the user device for presenting the corrected current geo-location of the user device.

In one embodiment, the system 100 may cause, at least in part, a generation of at least one correction-offset function. In one embodiment, a service provider may utilize one or more algorithms to generate a correction-offset function, which may be utilized to determine a corrected geo-location of a user device. For example, the correction-offset function may include one or more parameters, one or more calculations, one or more instructions, or the like for determining a corrected geo-location.

In one embodiment, the system 100 may cause, at least in part, a determination of a corrected current geo-location based, at least in part, on the current geo-location and the correction-offset function. In one scenario, a service provider may cause one or more applications or modules at a user device to utilize/execute a correction-offset function for determining a corrected current geo-location of the user device. For example, a map application at a user device may utilize the correction-offset function to determine a corrected current geo-location of the user device. In one scenario, a service provider may cause one or more databases, one or more other service providers, one or more data lists, or the like to utilize the correction-offset function for determining a corrected geo-location associated with one or more geo-locations therein.

In one embodiment, the system 100 may determine a probability factor for the correction-offset based, at least in part, on the data, communication information associated with a plurality of other user devices, the accuracy threshold, or a combination thereof. In one embodiment, a service provider may process or analyze communication information available from other user devices for determining a probability that a correction-offset associated with a certain geo-location may be correct. For instance, the service provider may determine that a database includes location information from a plurality of user devices indicating a high error rate in location information at a certain geo-location, wherein the probability factor can be calculated to indicate a likelihood that the correction-offset associated with that certain geo-location a substantially accurate. In one embodiment, the probability factor may be determined based on the accuracy threshold. For example, a high accuracy threshold associated with a certain geo-location may yield a lower probability factor since the high accuracy threshold would indicate a greater distance away from the geo-location associated with the correction-offset and therefore may not be as accurate.

In one embodiment, the system 100 may determine the current geo-location of the at least one user device based, at least in part, on a user profile information, the current geo-location, a service provider configuration, or a combination thereof. In various scenarios, a user may wish to determine when, where, how, under what conditions, etc. one or more service providers may determine the current geo-location of the user device. For example, the current geo-location of the user device may be determined based on a user profile (e.g., a private, public, etc.), a user device configuration (e.g., personal device, business device, etc.), the current geo-location of the user device (e.g., at work, at home, traveling, at a city center, at school, etc.) Additionally or alternatively, a service provider may utilize one or more configurations associated with communication information of its users for determining the current geo-location of a user device. Further, a service provider may utilize one or more configurations to indicate to other service providers whether a current geo-location of a user device may be determined.

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) including social networking, web browser, content sharing, multimedia applications, augmented reality (AR), virtual reality (VR), UI, map application, web client, etc. In various embodiments, the applications 103 may be utilized to capture, process, submit, analyze, append, tag, etc. various media or communication messaging items. For example, an application 103 on a UE 101 may be used to create and share a digital image and any related information.

Additionally, the applications 103 may facilitate communication with other UEs 101, one or more service providers 105a-105n (also collectively referred to as service providers 105), one or more content providers 107a-107n (also collectively referred to as content providers 107), one or more GPS satellites 109a-109n (also collectively referred to as GPS satellites 109), a location verification platform 121, a contextual location database 123, and/or with other components of the system 100 directly and/or via communication network 111. In one embodiment, the UEs 101 may include data/content collection modules 115a-115n (also collectively referred to as DC module 115) for determining and/or collecting data and/or content associated with the UEs 101, one or more users of the UEs 101, applications 103, one or more content items (e.g., multimedia content), and the like. In addition, the UEs 101 can execute an application 103 that is a software client for storing, processing, and/or forwarding one or more information items to other components of the system 100.

In various scenarios, the applications 103 and/or the DC module 115 may facilitate tagging of various elements present in a media item and/or may facilitate creating or associating metadata with the media item.

In one embodiment, the service providers 105 may include and/or have access to one or more service databases 117a-117n (also collectively referred to as service database 117), which may include various user information, user profiles, user preferences, one or more profiles of one or more user devices (e.g., device configuration, sensors information, etc.), service providers 105 information, other service providers' information, and the like. In one embodiment, the service providers 105 may include one or more service providers offering one or more services, for example, online shopping, social networking services (e.g., blogging), content sharing, media upload, media download, media streaming, account management services, or a combination thereof. Further, the service providers 105 may conduct a search for content items, media items, information, coupons, and the like associated with one or more users, POIs, geo-locations, and the like. In one embodiment, a service provider 105 may receive and process a request/input from a user for determining status information associated with one or more elements present in one or more media items. In one embodiment, the service provider 105 may utilize various algorithms, software applications, modules, hardware, firmware, and the like for processing, recognizing, detecting, comparing, and the like, content items (e.g., media items) that may be associated with a user, a user device, or the like.

In one embodiment, the content providers 107 may include and/or have access to one or more content database 119a-119n (also collectively referred to as content database 119), which may store, include, and/or have access to various content items. For example, the content providers 107 may store content items (e.g., at the content database 119) provided by various users, various service providers, crowd-sourced content, and the like. Further, the service providers 105 and/or the content providers 107 may utilize one or more service application programming interfaces (APIs)/integrated interface, through which communication, media, content, and information (e.g., associated with users, applications, services, content, etc.) may be shared, accessed and/or processed.

In various embodiments, the service providers 105 and/or the content providers 107 may include and/or have access to information associated with people, POIs, objects, etc. For example, the information may be available from various public, private, or government controlled databases, which may be accessed via the communication network 111.

In one embodiment, the location verification platform 121 may process and utilize various communication information associated with a UE 101 to determine the UE 101 location and further determine if that location information may be subject to a correction-offset. In one embodiment, the location verification platform 121 may compare location information of a UE 101 with contextual location information available in the contextual location database 123 for determining a correction-offset and/or a correction-offset function, which may be utilized to determine and estimate a corrected location of the UE 101.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 109 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the service providers 105, the content providers 107, the location verification platform 121, and the contextual location database 123 may communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101, the service providers 105, and the location verification platform 121 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
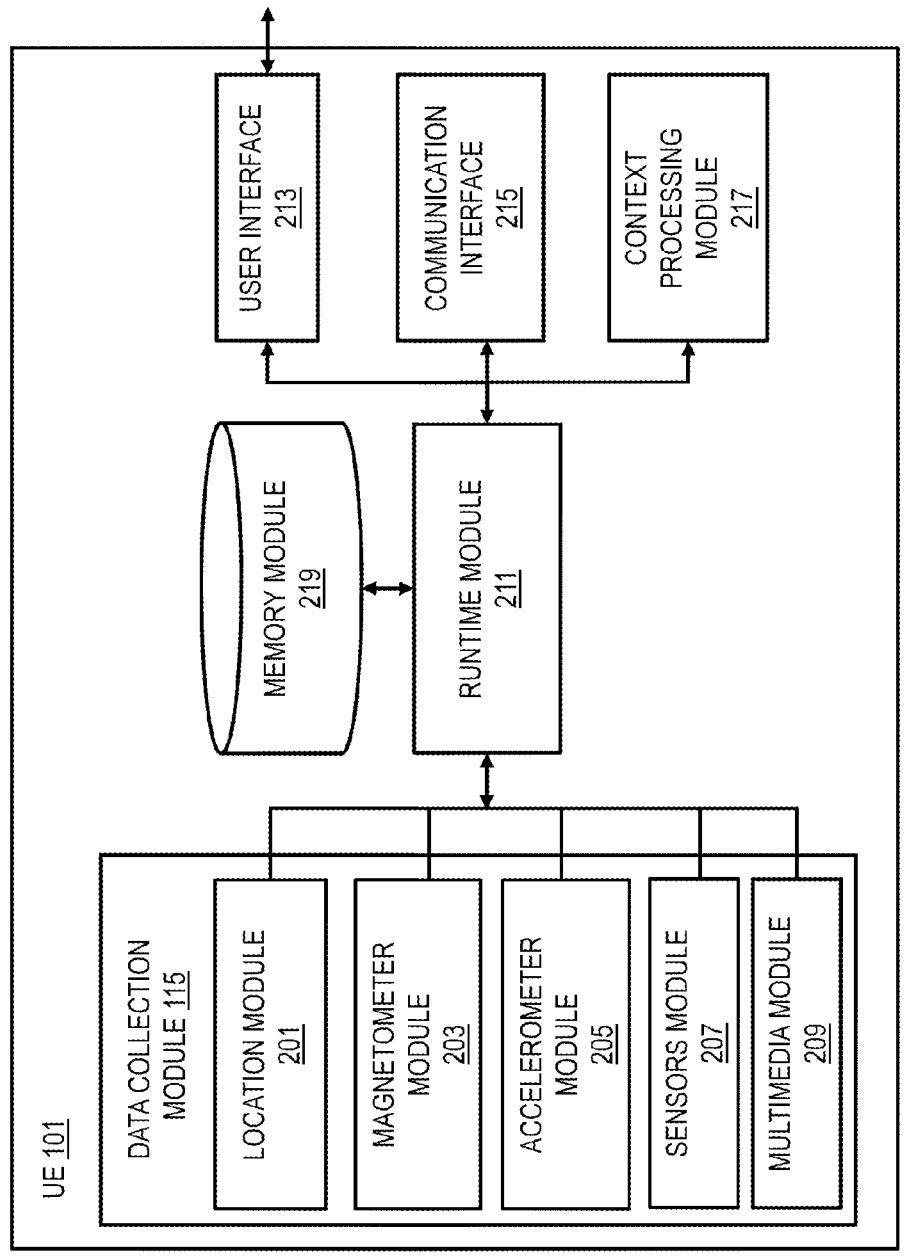
FIG. 2 is a diagram of the components of a user equipment, according to an embodiment.

FIG. 2 is a diagram of the components of a user equipment capable of communicating with one or more entities of a communication system, according to an embodiment. By way of example, a UE 101 includes one or more components for receiving and transmitting communication information including media content, textual messages, location information, and the like. It is contemplated that the functions of these components may be combined in one or more components or performed by other components of equivalent functionality. In this embodiment, the UE 101 includes a DC module 115 that may include one or more location modules 201, magnetometer modules 203, accelerometer modules 205, sensors module 207, and multimedia module 209. Further, the UE 101 may also include a runtime module 211 to coordinate the use of other components of the UE 101, a user interface 213, a communication interface 215, a context processing module 217, and a memory module 219. The applications 103 of the UE 101 can execute on the runtime module 211 utilizing the components of the UE 101.

The location module 201 can determine a user's location, for example, via location information associated with a UE 101. The user's location can be determined by a triangulation system such as GPS, assisted GPS (A-GPS), Cell of Origin, or other location extrapolation technologies. Standard GPS and A-GPS systems can use satellites 109 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory module 219 and are available to the context processing module 217, the DC module 115, the service providers 105, and/or to other entities of the system 100 (e.g., via the communication interface 215.) Moreover, in certain embodiments, the GPS coordinates can include an altitude to provide a height. In other embodiments, the altitude can be determined using another type of altimeter. In certain embodiments, the location module 201 can be a means for determining a location of the UE 101, an image, or used to associate an object in view with a location.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory module 219, made available to other modules and/or applications 103 of the UE 101, and/or transmitted via the communication interface 215 to one or more entities of the system 100.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In certain embodiments, the magnetometer module 203 and accelerometer module 205 can be means for ascertaining a perspective of a user. This perspective information may be stored in the memory module 219, made available to other modules and/or applications 103 of the UE 101, and/or sent to one or more entities of the system 100.

In various embodiments, the sensors module 207 can process sensor data from various sensors (e.g., GPS, accelerometer, gyroscope, thermometer, etc.) to determine environmental (e.g., atmospheric) conditions surrounding the UE 101, user mood (e.g., hungry, angry, tired, etc.), location information, and various other information from a range sensors that may be available on one or more devices. For example, the sensors module 207 may detect conditions including humidity, temperature, geo-location, biometric data of the user, etc. Once again, this information can be stored in the memory module 219 and sent to the context processing module 217 and/or to other entities of the system 100. In certain embodiments, information collected from the DC collection module 115 can be retrieved by the runtime module 211 and stored in memory module 219, made available to other modules and/or applications 103 of the UE 101, and/or sent to one or more entities of the system 100.

In one embodiment, the multimedia module 209 may be utilized to capture various media items, for example, graphical encoded data representations, images, video, audio, and the like, wherein the captured media may be submitted to one or more modules and applications of the UE 101, a service provider, and/or a content provider for further processing, storage, sharing, and the like. For example, a captured image of a graphical encoded data representations may be submitted to a service provider and/or the context processing module 217 for analysis and/or decoding. In one embodiment, the multimedia module 209 may also be utilized to process various media items for determining location information associated with a media content item. For example, a media item may be a picture that may include images of people, POIs, objects, buildings, etc. In one embodiment, the multimedia module 209 may use one or more image processing algorithms for processing a media item and for identifying one or more elements present into media item. For example, the media item may be an audio recording, which may include various sounds of people, objects, or the surroundings with the media item were recorded.

In various embodiments, the runtime module 211 may cause one or more modules/components of a UE 101 to associate one or more available data items with one or more content items at a UE 101. For example, date, time, location, and user information associated with a device at a particular time may be associated (e.g., as metadata) with a content consumption sessions.

The user interface 213 can include various methods of communication. For example, the user interface 213 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc.

In one embodiment, the communication interface 215 can be used to communicate with one or more entities of the system 100. Certain communications can be via methods such as an internet protocol, messaging (e.g., SMS, MMS, etc.), or any other communication method (e.g., via the communication network 111). In some examples, the UE 101 can send context information associated with the UE 101 to the service providers 105, content providers 107, and/or to other entities of the system 100.

The context processing module 217 may be utilized in determining context information from the DC module 115 and/or applications 103 executing on the runtime module 211. This information may be caused to be transmitted, via the communication interface 215, to the service providers 105 and/or to other entities of the system 100. The context processing module 217 may additionally be utilized as a means for determining information related to the user, an instance of data, a value, a content item, an object, a subject, and the like. In certain embodiments, the context processing module 217 can infer higher level context information from the context data such as favorite locations, significant places, common activities, interests in products and services, POIs at various geo-locations, etc.

Figure 3:
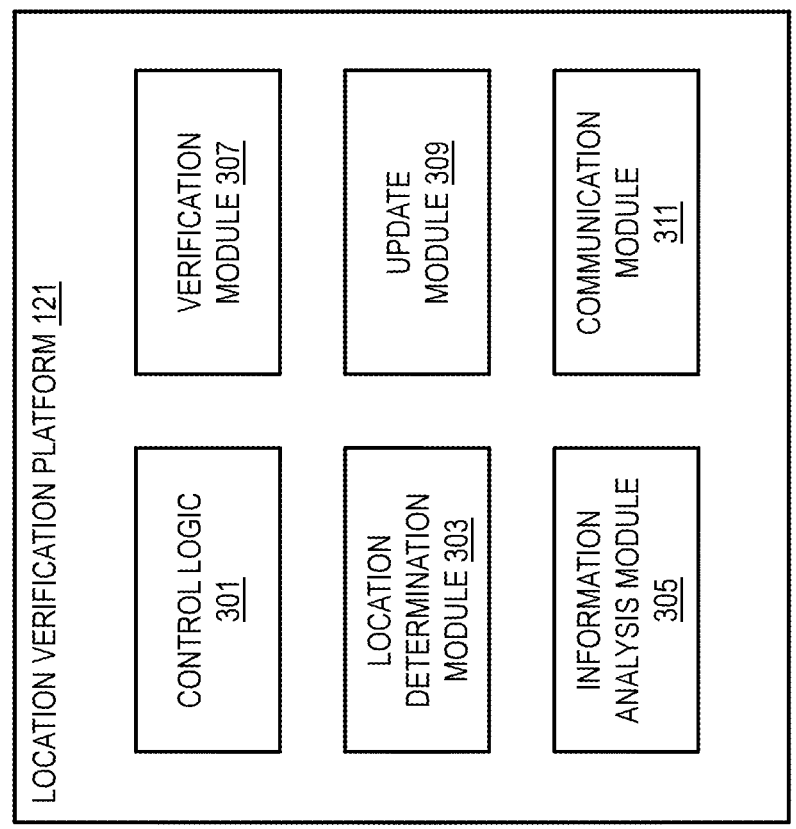
FIG. 3 is a diagram of the components of a location verification platform, according to an embodiment.

FIG. 3 is a diagram of components of a location verification platform, according to an embodiment. By way of example, the location verification platform 121 includes one or more components for processing and analyzing communication information associated with a UE 101, determining location information of the UE 101, and determining a correction-offset and/or a correction-offset function based, at least in part, on contextual location information available from one or more databases. It is contemplated that the functions of these components may be combined in one or more components or performed by other components of equivalent functionality. In this embodiment, the location verification platform 121 includes a control logic 301, a location determination module 303, an information analysis module 305, a verification module 307, an update module 309, and a communication module 311.

The control logic 301 interacts with the location determination module 303 to determine location information or location points associated with one or more UEs 101. In one embodiment, the location determination module 303 applies a deterministic asynchronous finite state detection algorithm to communication information associated with one or more UEs 101 including but not limited to data of Cell-ID, GPS, accelerometer, W-LAN, communication messages, content items, etc., to determine location information associated with the UEs 101 and/or location information included or embedded in a content item communicated from the UEs 101 to one or more entities (e.g., another UE 101, a social network site, etc.) of the system 100. In one embodiment, the location determination module 303 continuously or periodically may monitor communication information of a UE 101 for determining its location information.

In one embodiment, the information analysis module 305 may process and analyze various communication information items associated with a UE 101. In various scenarios, the communication information may be initiated by a user or by the user device. For example, the user may post a message, e.g., including media or text, to one or more social network sites, or the user device may initiate a predetermined communication signaling (e.g., communication channel signals) with one or more service providers. In one embodiment, content of a communication message from a user device may be processed to determine location information, possible POIs, or the like, which may be included in metadata associated with the content. For example, a digital image file may include the location information where the image was captured, received, created, or the like. In one embodiment, communication information from a user device may be received by one service provider and then shared with one or more other service providers that may process and utilize the communication information. For example, a communications service provider may receive a message from a user device intended for a certain recipient, and then according to a user agreement, the service provider may provide that message to second service provider, for example, so that the second service provider may provide location tracking or location correction services. In one embodiment, the information analysis module 305 may parse the communication information and any content therein to identify references to POIs or location-based references. In one embodiment, one or more communications postings in the communication information, e.g., social network services 105, may be processed to determine POI or location related information. In one example, a parsing of the communications may be based on a linguistic analysis of the data (e.g., map, POI, location-based and location related keywords and phrases). For example, one communication message with a social network services 105 may be related to a user visiting a specific POI, and another communication may indicate that the user is planning a gathering with friends near a POI.

In one embodiment, the verification module 307 may be used to compare the location information determined from the communication information with relevant contextual location information available in one or more databases. In one scenario, the contextual location information in the databases may be based on information reported by other user devices that were at or near the determined location. In one embodiment, the databases may include information from one or more contextual location information collection and verification service providers. For example, the database may include data from a mapping service provider. In one embodiment, a comparison of the determined location information of UE 101 may indicate that the determined location may be inaccurate and may be associated with a known correction-offset. For example, the inaccuracy may be due to poor communication signaling from or to the UE 101 at its current location. In one embodiment, the determined location information may include a reference to a POI, which may be compared to location information of the POI and determine if the determined location information of the UE 101 is substantially accurate or would it be subject to a possible correction.

Further, the update module 309 may interact with the verification module 307 to determine a possible update to location information of a UE 101. In one embodiment, the update module 309 may determine one or more parameters (e.g., GPS coordinates) for a correction-offset associated with location information of a UE 101 and/or location information of a geo-location area determined from the location information. In one embodiment, the update module 309 may determine a correction-offset based on a threshold criteria including a correctness probability, a level of confidence, a degree of trust, a rating, or the like associated with the location information. In one embodiment, if a correction-offset is considered accurate and valid, then it may be propagated to one or more UEs 101 associated with the location, one or more service providers, or one or more location information databases. In addition or alternatively, the update module 309 may determine an algorithmic function that may be transmitted to and used by a UE 101 or a service provider for determining a correction-offset associated with a geo-location. For example, a correction-offset function may be associated with a particular geo-location which may be known to have a certain error in location information determined from various UEs 101 located near or at that geo-location.

The communication module 311 can be used to communicate with one or more entities of the system 100. Certain communications can be via methods such as an internet protocol, messaging (e.g., SMS, MMS, etc.), or any other communication method (e.g., via the communication network 111). In some examples, the location verification platform 121 can receive or transmit location information, communication information, correction-offsets, correction-offset functions, or the like from and to one or more entities of the system 100.

Figure 4:
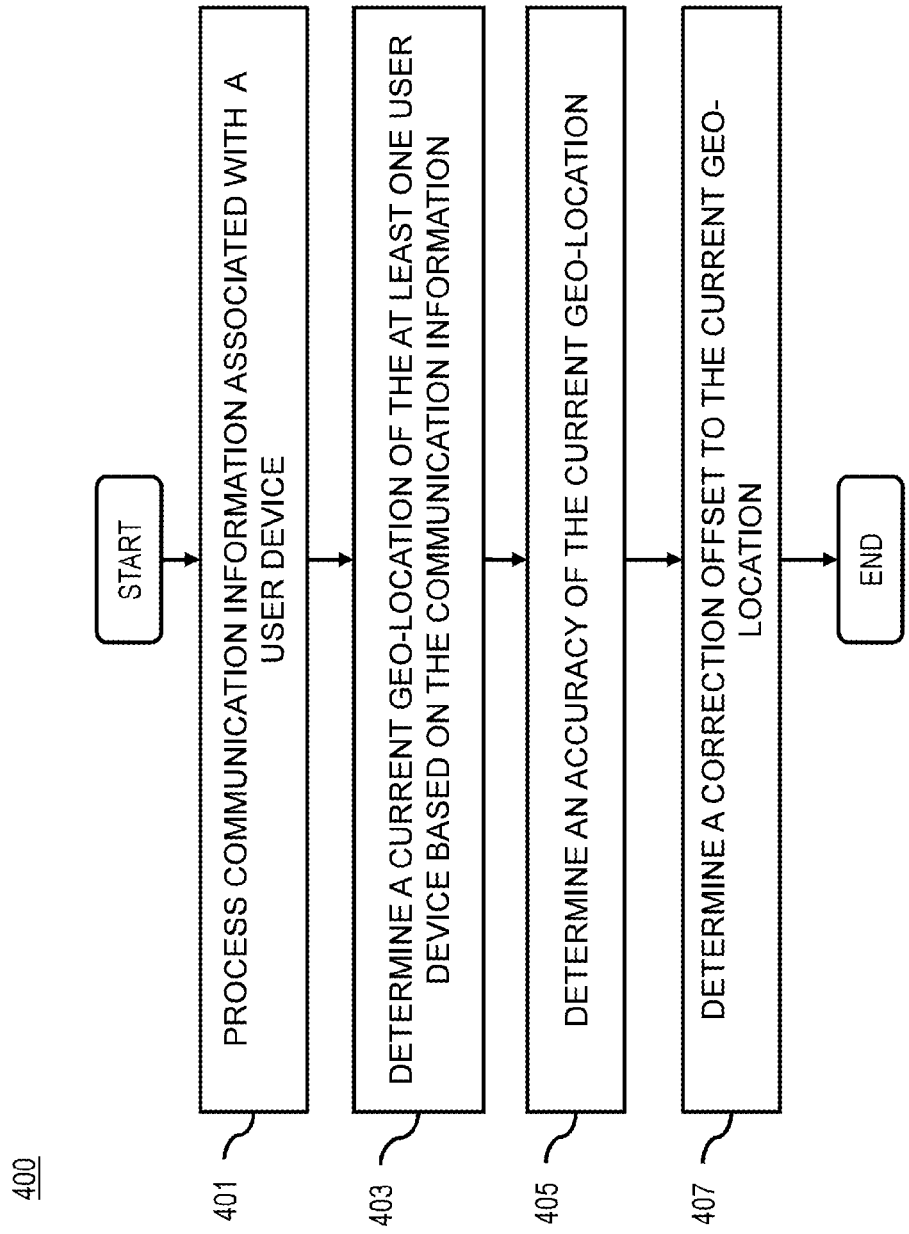
FIGS. 4 through 6 are flowcharts of various processes for, at least, efficiently and accurately processing communication information from a user device for determining a possible correction-offset to location information of the user device.
Figure 5:
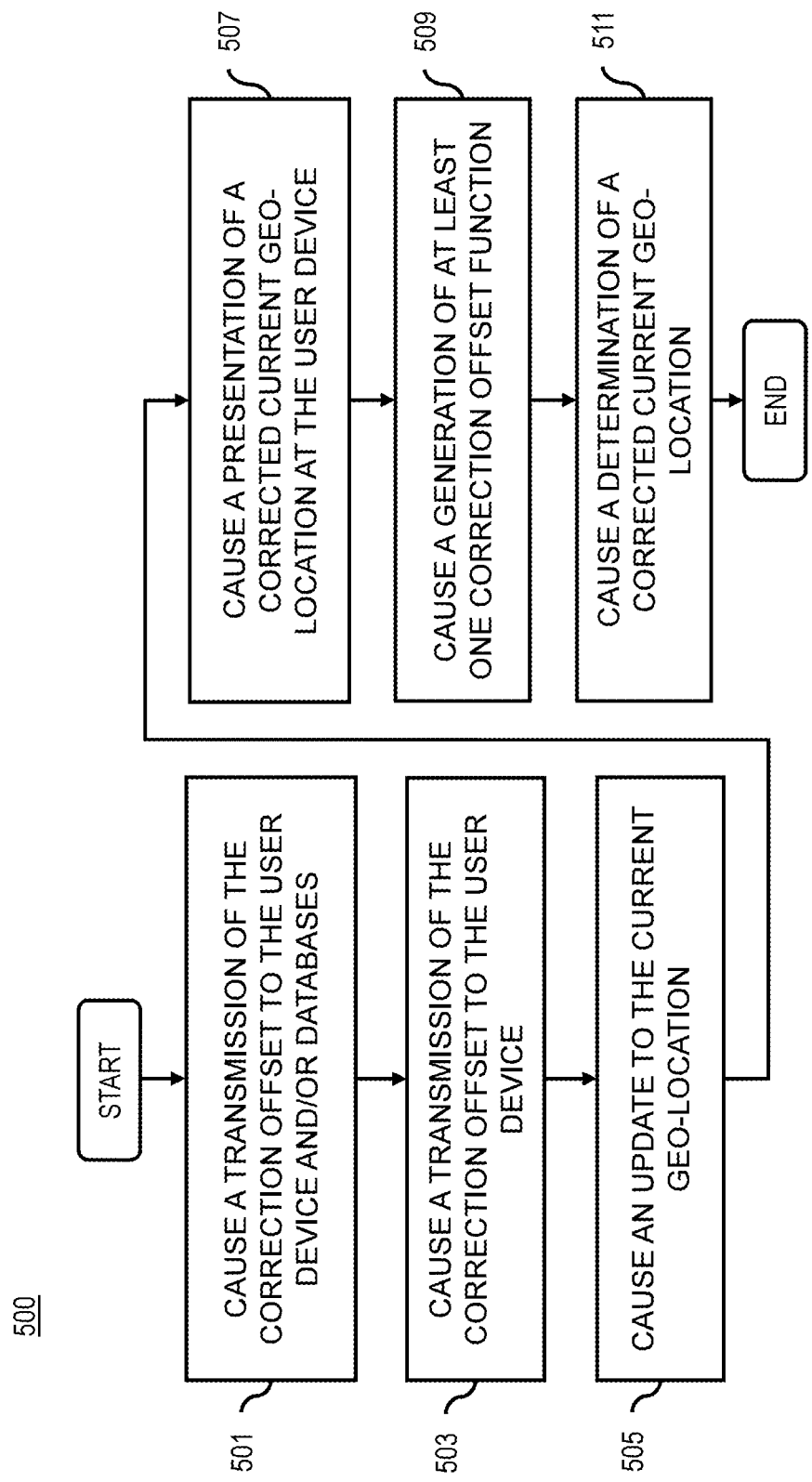
Figure 6:
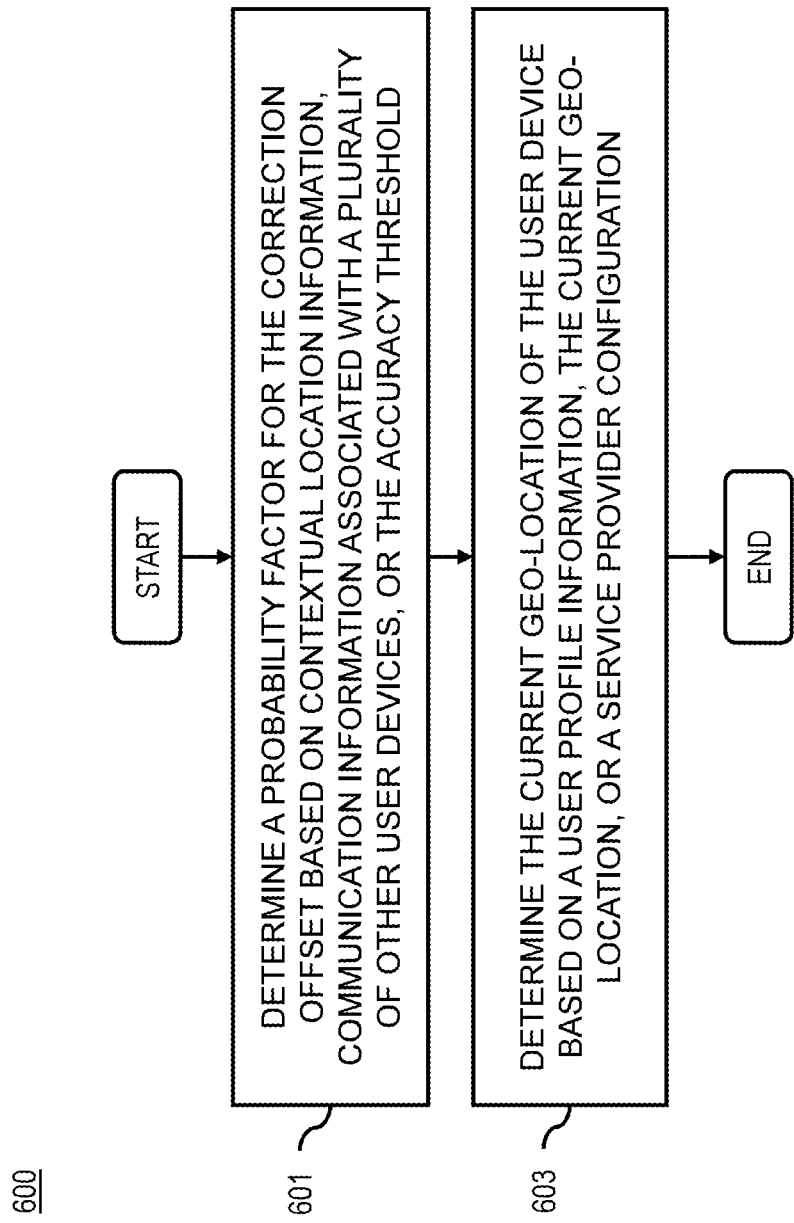
Figure 11:
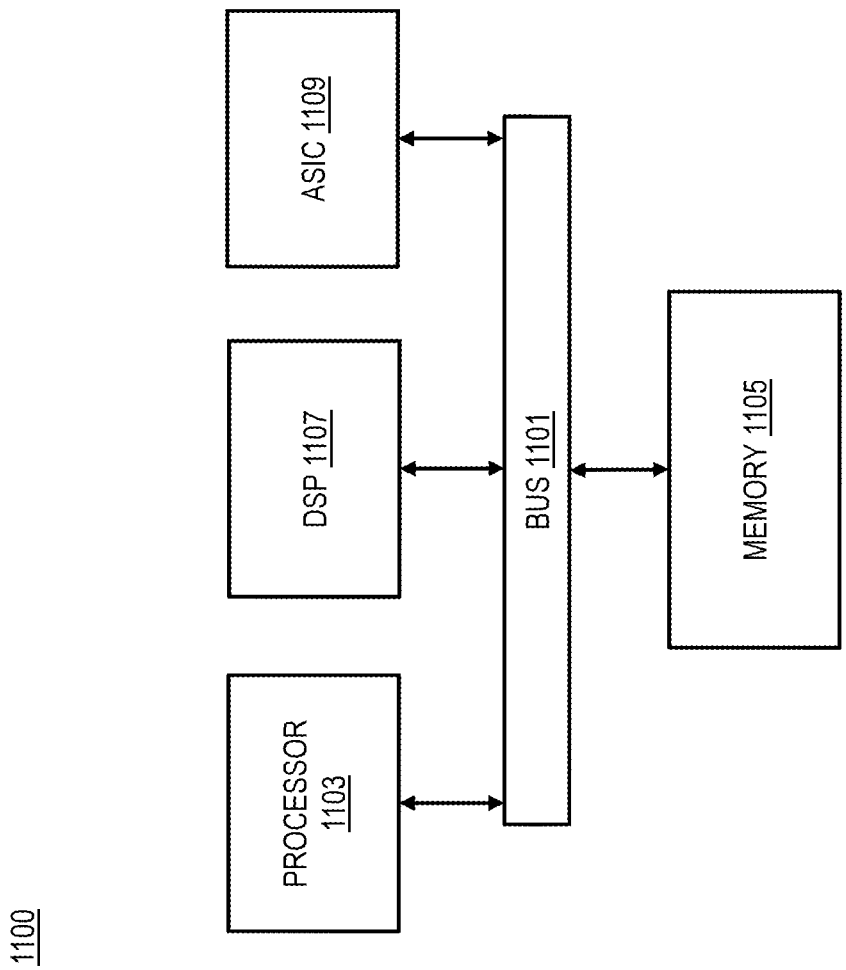
FIG. 11 is a diagram of a chip set that can be used to implement an embodiment of the invention.

FIGS. 4 through 6 are flowcharts of various processes for, at least, efficiently and accurately process communication information from a user device for determining a possible correction-offset to location information of the user device, according to various embodiments. In various embodiments, location verification platform 121 may perform one or more portions of the processes 400, 500, and 600, which may be implemented in, for instance, a chip set including a processor and a memory as shown in FIG. 11. As such, the location verification platform 21 can provide means for accomplishing various parts of the process 400, 500, and 600 as well as means for accomplishing other processes in conjunction with other components of the system 100. Throughout these processes, the location verification platform 121 may be referred to as completing various portions of the processes 400, 500, and 600, however, it is understood that other components of the system 100 can perform some of and/or all of the process steps. Further, for clarity in discussing the 400, 500, and 600 processes, the location verification platform 121 is referred to as completing various steps of said processes; however, said processes and/or example steps described therein may be performed in any suitable order and/or may be optional.

The process 400 may begin at step 401 of the FIG. 4, where the location verification platform 121 may process and/or facilitate a processing of communication information associated with at least one user device. In various scenarios, the communication information may be based on a phone call, a message, a transfer of content, user device information, user information, or the like which may be initiated by a user of the user device or one or more applications/modules at the user device. For example, the communication information may be based on a user uploading a media file or a message to a social network site. In various embodiments, the communication information includes active, passive, direct, indirect, or a combination thereof communication information originating, at least in part, from the at least one user device. In one scenario, active communication information may be included in a communication session (e.g., a phone call, a content upload or download, etc.) initiated by a user or a user device, where the communication may be with another user or one or more service providers in the system 100. In another scenario, passive communication information may be included in a communication session/message initiated by the user or the user device where the information is transmitted or received in the background by one or more applications or modules of the user device. In one example, a user device periodically may transmit or receive various signals associated with a communication channel utilized by the user device. In one scenario, a service provider may request or receive the communication information directly from a user device, and in another scenario, the service provider may request or receive the communication information indirectly via one or more other service providers that may have access to the communication information of a user device.

In step 403, the location verification platform 121 may determine a current geo-location of the at least one user device based, at least in part, on the communication information. In one embodiment, the system 100 may utilize one or more algorithms to parse, process, and analyze the communication information to determine potential location information of the user device. For example, a media file may be processed to determine an included image, video, or audio content item that may be associated with a POI or a certain geo-location, which may be used to determine location information of the user device. In one example, the communication information may include textual content which may be analyzed to determine any references to a POI or a certain geo-location. For instance, a social network post from a user device may include a picture of the Eiffel Tower in Paris, France and a textual message indicating that the user is visiting the Eiffel Tower. In another example, the communication information may include additional location information (e.g., GPS coordinates) reported by a map application at the user device.

In step 405, the location verification platform 121 may determine an accuracy of the current geo-location based, at least in part, on a comparison of the current geo-location with contextual location information associated with the current geo-location. In one scenario, the system 100 may determine and compare the current location of a user device with contextual location information available from one or more contextual databases in order to evaluate the accuracy of the current location of the user device determined from the communication information. For instance, the system 100 may have determined that the user device is currently at a certain geo-location, and then that certain location information may be compared to contextual location information in one or more contextual databases to ascertain if there are any known issues with location information associated with that certain geo-location. In one instance, a contextual database may include information about a given geo-location or area, e.g., known POIs, GPS coordinates, address, known errors in determining or reporting location information of devices, and the like. In one embodiment, location information determined from the communication information may be compared to other location information included in the communication information. In one scenario, the system 100 may have detected an image or text in a communication information, which may be associated with a certain POI and based on that POI, a current geo-location is determined for the user device. However, actual location information (e.g., GPS coordinates, cellular tower information, etc.) from the user device may indicate that the user device is at a different location than the one the system 100 has determined based on the POI location information. For example, a user may post a message to a social network site (including a picture) that the user is visiting the Metropolitan Museum of Arts in New York City; however, the user may be posting that message when he is already at a different location and is away from the Museum's location. In this case, the location information determined from the message (e.g., the Museum location) would be different than the actual location information provided by the user device (e.g. GPS coordinates). In one embodiment, the contextual location information includes one or more validated data/information items associated with one or more points of interest associated with the current geo-location, a corrected current geo-location, or a combination thereof. For example, the contextual location information may be validated based on information available from a plurality of user devices associated with a certain geo-location, or the contextual location information may be validated by one or more service providers that may collect and verify the contextual location information available in various databases.

In step 407, the location verification platform 121 may determine a correction-offset to the current geo-location based, at least in part, on an accuracy threshold. In one embodiment, an accuracy threshold may indicate a geographical area in relation to a current location of a user device, wherein a correction-offset to the current location of the user device should be determined. For example, a user profile at a user device or at a service provider may indicate that a correction-offset should be determined/calculated if the location information of the user device indicates an error of more than 200 meters. In various embodiments, the accuracy threshold may be determined based on geographical area of the user device, activity of the user, time of day, resources status at the user device, confidence level of location contextual location information available in one or more databases, or the like.

The process 500 may begin at step 501 of the FIG. 5, where the location verification platform 121 cause, at least in part, a transmission of the correction-offset to the at least one user device, one or more databases, or a combination thereof. In one embodiment, a correction-offset may be transmitted to a user device, wherein one or more applications or modules at the user device may utilize the correction-offset to determine a corrected current geo-location for the user device. In one embodiment, the correction-offset for a particular geo-location may be transmitted to one or more databases, wherein contextual location information of that particular geo-location may be corrected, for example, for future use by one or more service providers or one or more user devices.

In step 503, the location verification platform 121 may cause, at least in part, a transmission of the correction-offset to the at least one user device based, at least in part, on the current geo-location. In one embodiment, a correction-offset may be transmitted to a user device if the user device is near or is at a certain geo-location. For instance, a user profile or a user device configuration may indicate that a correction-offset should be sent to the user device only when the user device is at a certain geo-location. In one scenario, a user may wish to receive a location correction-offset when at a different area than his home area since he may be unfamiliar with the area and require accurate location information.

In step 505, the location verification platform 121 may cause, at least in part, an update to the current geo-location based, at least in part, on one or more correction-offsets in one or more data lists. In one embodiment, a service provider may determine that there are one or more correction-offsets associated with a current geo-location of a user device, wherein the correction-offsets may be analyzed and an update may be transmitted to the user device. For example, a service provider may determine a current geo-location of the user device, and then further determine that there are various correction-offsets available in one or more databases or data lists. In one embodiment, a service provider may determine to select from the one or more correction-offsets a best correction-offset for transmission to a user device. For example, the service provider may select a correction-offset from a database or a data list that has been validated or that has a high confidence level of accuracy.

In step 507, the location verification platform 121 may cause, at least in part, a presentation of a corrected current geo-location at the at least one user device. In one scenario, a service provider may cause one or more applications or modules at a user device to present a corrected current geo-location at a user device, wherein the corrected current geo-location may be based on a correction-offset determined from one or more databases or data lists. For example, after determining a correction-offset for a current geo-location of a user device, the service provider may transmit one or more commands to an application at the user device for presenting the corrected current geo-location of the user device.

In step 509, the location verification platform 121 may cause, at least in part, a generation of at least one correction-offset function. In one embodiment, a service provider may utilize one or more algorithms to generate a correction-offset function, which may be utilized to determine a corrected geo-location of a user device. For example, the correction-offset function may include one or more parameters, one or more calculations, one or more instructions, or the like for determining a corrected geo-location.

In step 511, the location verification platform 121 may cause, at least in part, a determination of a corrected current geo-location based, at least in part, on the current geo-location and the correction-offset function. In one scenario, a service provider may cause one or more applications or modules at a user device to utilize/execute a correction-offset function for determining a corrected current geo-location of the user device. For example, a map application at a user device may utilize the correction-offset function to determine a corrected current geo-location of the user device. In one scenario, a service provider may cause one or more databases, one or more other service providers, one or more data lists, or the like to utilize the correction-offset function for determining a corrected geo-location associated with one or more geo-locations therein.

The process 600 may begin at step 601 of the FIG. 6, where the location verification platform 121 may determine a probability factor for the correction-offset based, at least in part, on the data, communication information associated with a plurality of other user devices, the accuracy threshold, or a combination thereof. In one embodiment, a service provider may process or analyze communication information available from other user devices for determining a probability that a correction-offset associated with a certain geo-location may be correct. For instance, the service provider may determine that a database includes location information from a plurality of user devices indicating a high error rate in location information at a certain geo-location, wherein the probability factor can be calculated to indicate a likelihood that the correction-offset associated with that certain geo-location a substantially accurate. In one embodiment, the probability factor may be determined based on the accuracy threshold. For example, a high accuracy threshold associated with a certain geo-location may yield a lower probability factor since the high accuracy threshold would indicate a greater distance away from the geo-location associated with the correction-offset and therefore may not be as accurate.

In step 603, the location verification platform 121 may determine the current geo-location of the at least one user device based, at least in part, on a user profile information, the current geo-location, a service provider configuration, or a combination thereof. In various scenarios, a user may wish to determine when, where, how, under what conditions, etc. one or more service providers may determine the current geo-location of the user device. For example, the current geo-location of the user device may be determined based on a user profile (e.g., a private, public, etc.), a user device configuration (e.g., personal device, business device, etc.), the current geo-location of the user device (e.g., at work, at home, traveling, at a city center, at school, etc.) Additionally or alternatively, a service provider may utilize one or more configurations associated with communication information of its users for determining the current geo-location of a user device. Further, a service provider may utilize one or more configurations to indicate to other service providers whether a current geo-location of a user device may be determined.

Figure 7:
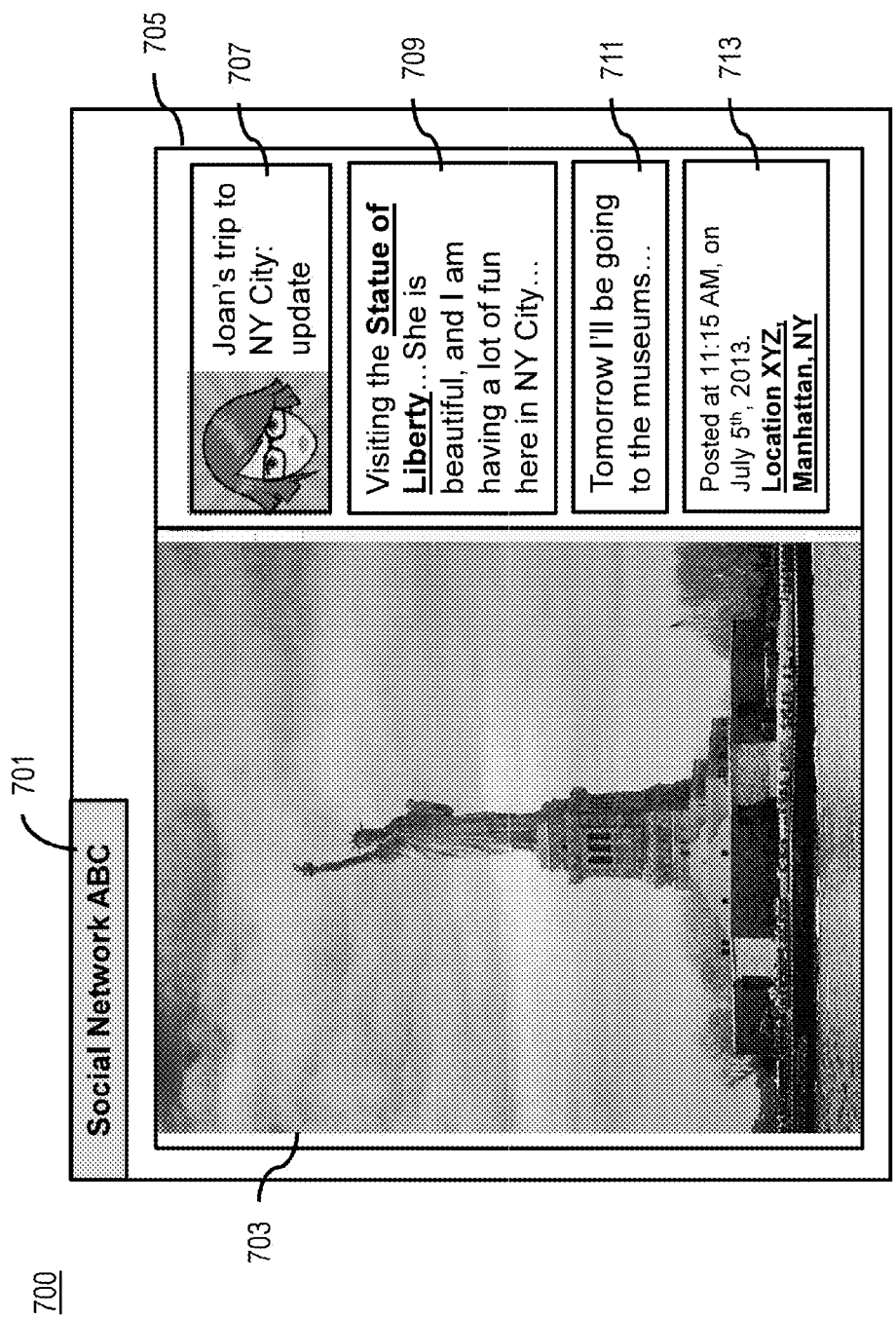
FIG. 7 illustrates a user message posting by a user, according to an embodiment.

FIG. 7 illustrates a user message posting by a user, according to an embodiment.

Figure 8:
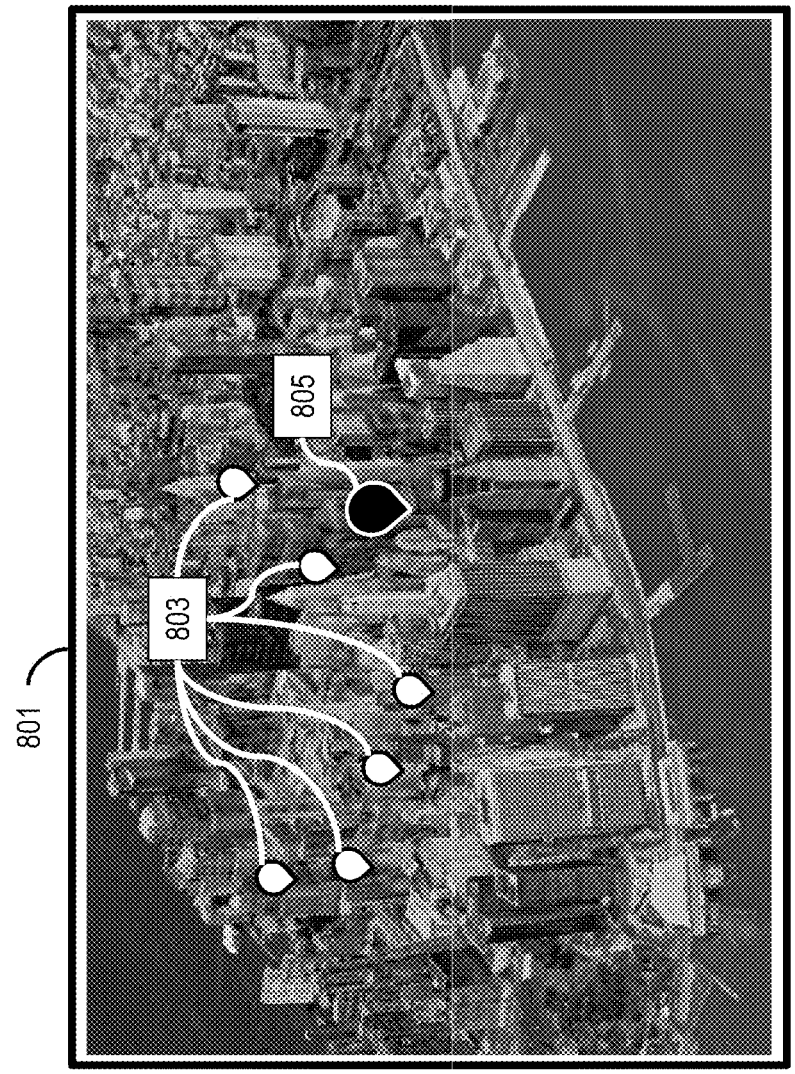
FIG. 8 illustrates locations of user devices associated with communication information from the user devices, according to an embodiment.

In one scenario, a communication from a UE 101 may include a user message 700, which may be intended for a posting onto one or more social network sites, for example, to a "social network ABC" 701 and/or may be intended for one or more other users. In one embodiment, the location verification platform 121 may process and analyze the user message 700 and determine that it includes a media content item 703 and/or a textual message 705, which may include one or more information items 707, 709, 711, and 713. In one embodiment, the location verification platform 121 may process the media content item 703 to determine one or more possibly included POIs. In one scenario, the processing may include an image detection analysis to determine the one or more POIs. In this example, the media item 703 includes an image of the U.S. Statue of Liberty National Monument in New York. In one embodiment, the location verification platform 121 may process the textual message 705 to determine one or more information items included therein. In one example, the textual message may indicate information about a POI, for example, the statue of liberty in message portion 709, wherein the location verification platform 121 may utilize that information to determine a location information of the user device that initiated the communication of the user message 700. Additionally, the user message 700 may include metadata 713 which may indicate location information associated with the user message 700 or more portions of the user message 700. For example, the metadata 713 may indicate that the message 700 was posted from location XYZ, in Manhattan, N.Y. In one embodiment, the location verification platform 121 may compare the location information determined from the user message 700 with a current location information of the user device. In one example, location information of the user device may substantially match the location information of the POI determined from the user message 700. In various scenarios, the current location information of the user device may or may not match location information of the POI determined by the location verification platform 121. For example, the user posting the message 700 may have posted the message from the location of the Statue of Liberty or, as in FIG. 8, sometime later from a location 805 in Manhattan, N.Y. In one scenario, FIG. 8 also depicts an urban area where location information from user devices 803 as well as 805 may include inaccurate or incomplete location information due to the high density of the buildings which may present interference with communication signals for determining location information or reporting location information associated with the user devices.

In one embodiment, the location verification platform 121 may determine a correction-offset for location information of the user device 805 to indicate that the user message 700, although associated with the POI Statue of Liberty, was indeed posted from a location in Manhattan, N.Y. In one scenario, the correction-offset may cause an update to a presentation of the location of the UE 101 indicative of location 805. In various scenarios, a corrected current location information of the UE 101 may be presented and/or shared with one or more other users, one or more service providers, one or more social network sites, or the like. In one embodiment, the communication message 701 and/or one or more associated communication information items may be shared with one or more other service providers, which may determine the current location information, the correction-offset, or the like.

Figure 9A:
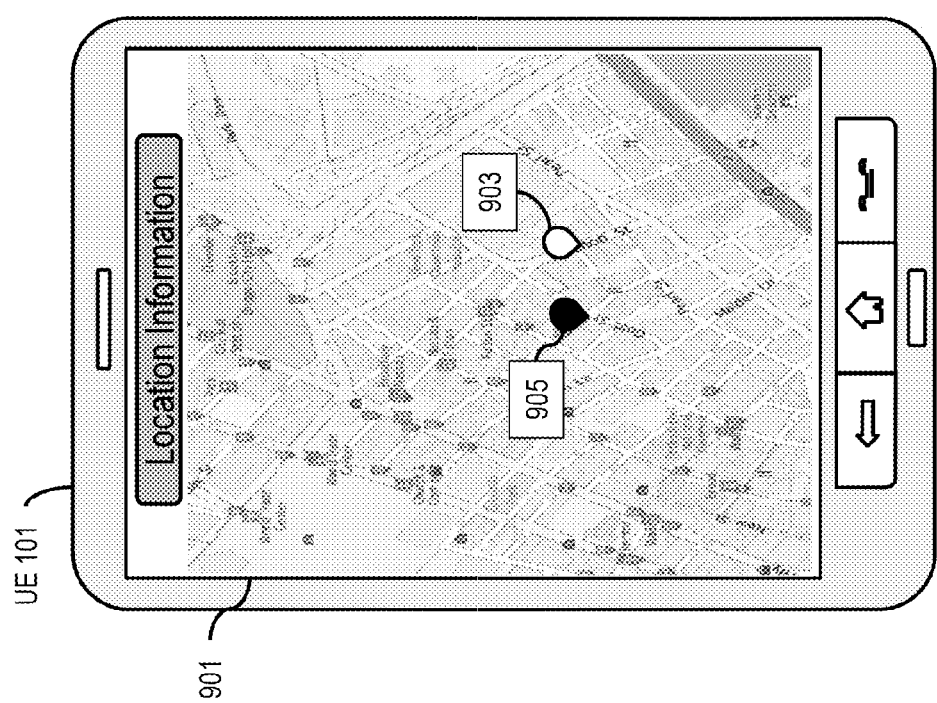
FIGS. 9A and 9B illustrate example user interface diagrams utilized in the processes of the FIGS. 4 through 6, according to various embodiments.
Figure 9B:
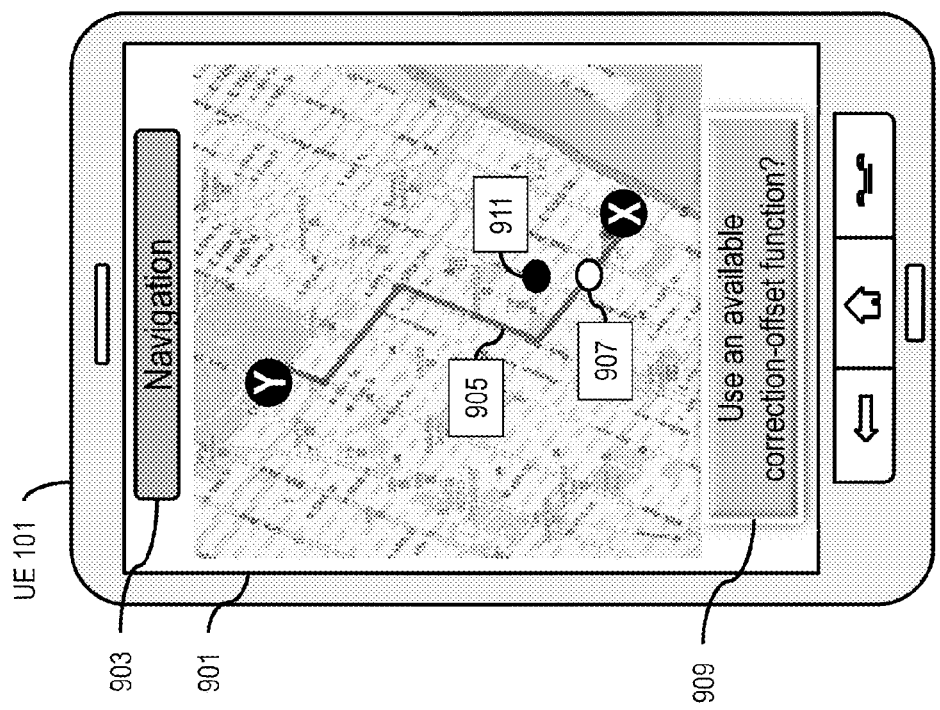

FIGS. 9A and 9B illustrate example user interface diagrams utilized in the processes of the FIGS. 4 through 6, according to various embodiments.

In FIG. 9A, the UE 101 may determine and present location 903 of the UE 101 on a map application 901. In one embodiment, the location verification platform 121 may determine a correction-offset to the location 903 and cause a presentation of the corrected current location 905 of the UE 101. For example, the corrected current location 905 may be 200 meters away from the location 903. In various scenarios, the discrepancy between the locations 903 and 905 may be due to incomplete or erroneous location information reported by the UE 101 or determined by the location verification platform 121. In one embodiment, the corrected current location 905 may be presented at the UE 101 based on an accuracy threshold, a user profile, the location of the UE 101, a service provider configuration, or the like. For example, if the correction-offset is less than 100 meters, then may not be presented at or communicated to the UE 101.

FIG. 9B illustrates a presentation of navigation application 903 wherein location information of the UE 101 is presented on the map application 901. In one embodiment, the location verification platform 121 may determine a correction-offset function for determining a corrected current location information of the UE 101, wherein the correction-offset function may be utilized by the UE 101 or one or more service providers for determining the corrected current location information of the UE 101. In one example, a correction-offset function may be transmitted to the UE 101 where one or more applications 103 may utilize the function to determine and present a corrected current location information of the UE 101. In one embodiment, an application or a module at the UE 101 may present a prompt 909 indicating that a correction-offset function is available for determining a corrected current location information of the UE 101. In one scenario, a user of the UE 101 may choose to utilize the correction-offset function presented via the prompt 909 for determining a corrected current location information of the UE 101. In one use case scenario, the navigation application 903 is presenting a navigation route 905 onto the map application 901, wherein the route 905 is from point X two point Y and the current location of the UE 101 is at indicator 907. However, execution of the correction-offset function in the prompt 909 may cause a determination that a corrected current location of the UE 101 is at a different location as indicated by the indicator 911. In one embodiment, one or more applications or modules at the UE 101 may utilize a corrected current location information of a UE 101 and determine a correction to a navigation route presented at the UE 101.

The processes described herein to efficiently and accurately process communication information from a user device for determining a possible correction-offset to location information of the user device may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
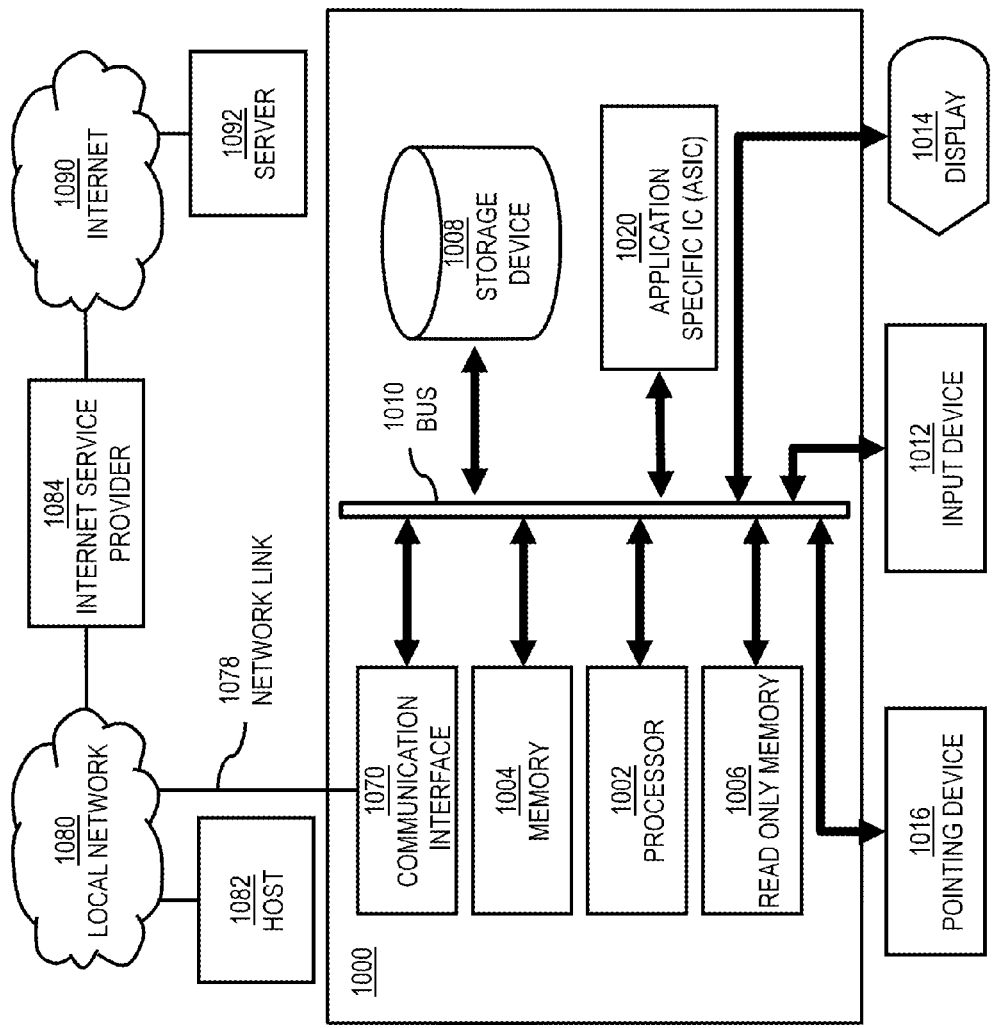
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to efficiently and accurately process communication information from a user device for determining a possible correction-offset to location information of the user device as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of efficiently and accurately process communication information from a user device for determining a possible correction-offset to location information of the user device.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to efficiently and accurately process communication information from a user device for determining a possible correction-offset to location information of the user device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for efficient and accurate processing of communication information from a user device for determining a possible correction-offset to location information of the user device. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for efficient and accurate processing of communication information from a user device for determining a possible correction-offset to location information of the user device, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 111 for efficient and accurate processing communication information from a user device for determining a possible correction-offset to location information of the user device.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to efficiently and accurately process communication information from a user device for determining a possible correction-offset to location information of the user device as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of efficiently and accurately process communication information from a user device for determining a possible correction-offset to location information of the user device.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to efficiently and accurately process communication information from a user device for determining a possible correction-offset to location information of the user device. The memory 1105 also stores the data associated with or generated by the execution of the inventive steps.

Figure 12:
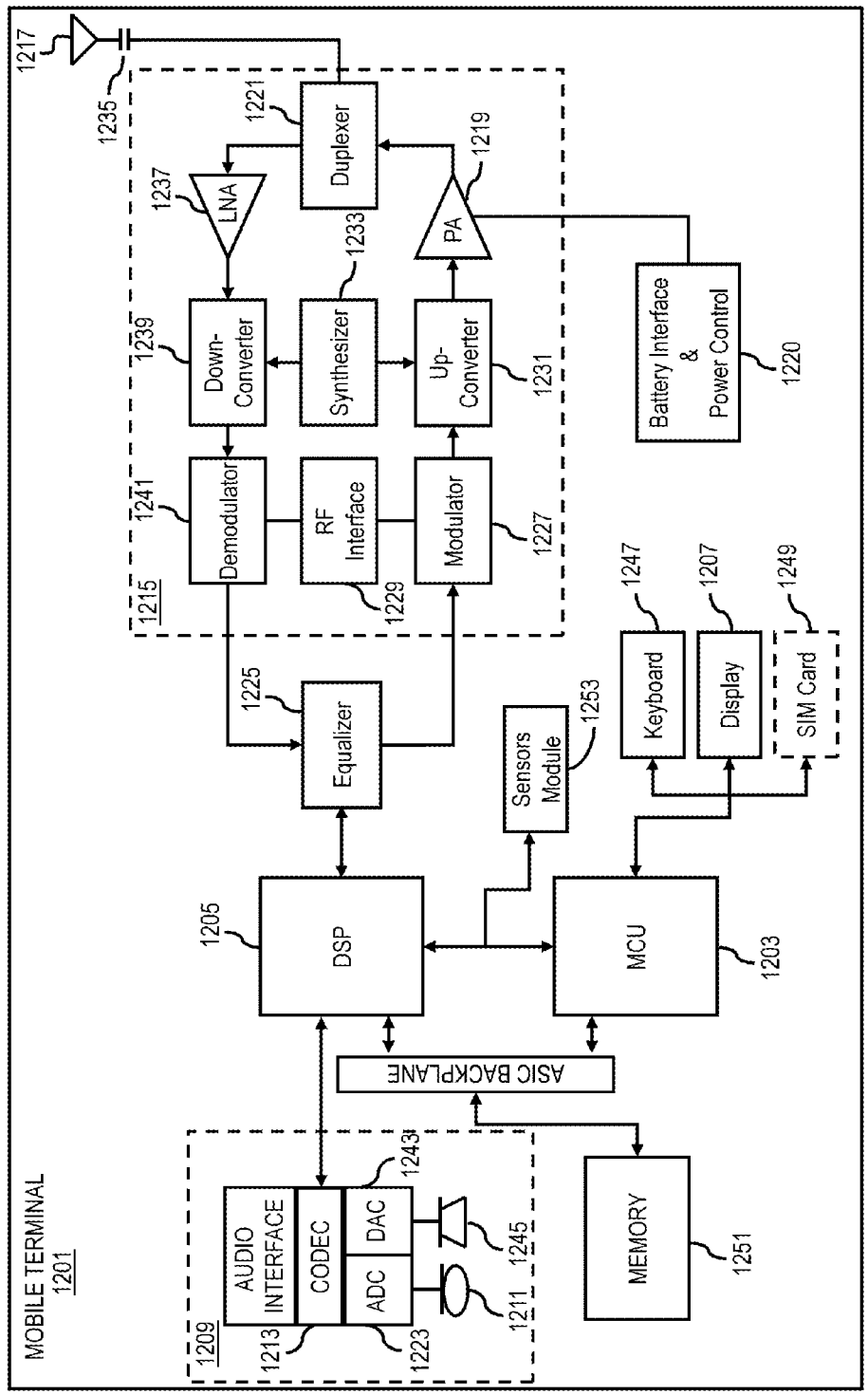
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of efficiently and accurately process communication information from a user device for determining a possible correction-offset to location information of the user device. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of efficiently and accurately process communication information from a user device for determining a possible correction-offset to location information of the user device. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to efficiently and accurately process communication information from a user device for determining a possible correction-offset to location information of the user device. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Additionally, sensors module 1253 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1201 (e.g., a mobile phone), a user of the mobile terminal 1201, an environment of the mobile terminal 1201 and/or the user, or a combination thereof, wherein the data may be collected, processed, stored, and/or shared with one or more components and/or modules of the mobile terminal 1201 and/or with one or more entities external to the mobile terminal 1201.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
processing via a processor communication information associated with at least one user device;
determining via the processor a current geo-location of the at least one user device based on the communication information;
determining via the processor an accuracy error of the current geo-location based on a comparison of the current geo-location with contextual location information associated with the current geo-location;
determining via the processor a correction-offset to the current geo-location based on an indication that the accuracy error in the determined current geo-location of the user device is greater than a predetermined accuracy threshold;
transmitting the correction-offset to the at least one user device based on the current geo-location; and
determining a probability factor for the correction-offset based on communication information associated with a plurality of other user,
wherein the contextual location information includes one or more validated information items associated with one or more points of interest associated with the current geo-location, a corrected current geo-location, or a combination thereof,
wherein the communication information associated with the plurality of other users comprises communication information from a database including location information from the plurality of user devices indicating a high error rate in location information at a certain geo-location,
wherein the predetermined accuracy threshold is provided in a user profile at the user device, and
wherein the correction-offset is at least a parameter or a correction-offset function for determining a corrected geo-location.

2. A method of claim 1, the method further comprising:
transmitting the correction-offset to one or more databases.

3. A method of claim 1, the method further comprising:
updating the current geo-location based on one or more correction-offsets in one or more data lists.

4. A method of claim 1, the method further comprising:
presenting a corrected current geo-location at the at least one user device.

5. A method of claim 1, further comprising:
determining the current geo-location of the at least one user device based on the current geo-location, a service provider configuration, or a combination thereof.

6. A method of claim 1, wherein the communication information includes active, passive, direct, indirect, or a combination thereof communication information originating from the at least one user device.

7. An apparatus comprising:
at least one processor; and
at least one non-transitory memory including computer program code for one or more programs,
the at least one non-transitory memory and the computer program code configured to, with the at least one processor, cause the apparatus to perform at least the following:
process and/or facilitate a processing of communication information associated with at least one user device;
determine a current geo-location of the at least one user device based on the communication information;
determine an accuracy error of the current geo-location based on a comparison of the current geo-location with contextual location information associated with the current geo-location;
determine a correction-offset to the current geo-location based on an indication that the accuracy error in the determined current geo-location of the user device is greater than a predetermined accuracy threshold;
transmit the correction-offset to the at least one user device based on the current geo-location; and
determine a probability factor for the correction-offset based on communication information associated with a plurality of other user devices,
wherein the contextual location information includes one or more validated information items associated with one or more points of interest associated with the current geo-location, a corrected current geo-location, or a combination thereof,
wherein the communication information associated with the plurality of other users comprises communication information from a database including location information from the plurality of user devices indicating a high error rate in location information at a certain geo-location,
wherein the predetermined accuracy threshold is provided in a user profile at the user device, and
wherein the correction-offset is at least a parameter or a correction-offset function for determining a corrected geo-location.

8. An apparatus of claim 7, wherein the apparatus is further caused to:
cause a transmission of the correction-offset to one or more databases, or a combination thereof.

9. An apparatus of claim 7, wherein the apparatus is further caused to:
cause an update to the current geo-location based on one or more correction-offsets in one or more data lists.

10. An apparatus of claim 7, wherein the apparatus is further caused to:
cause a presentation of a corrected current geo-location at the at least one user device.

11. An apparatus of claim 7, wherein the apparatus is further caused to:
determine the current geo-location of the at least one user device based on the current geo-location, a service provider configuration, or a combination thereof.

12. An apparatus of claim 7, wherein the communication information includes active, passive, direct, indirect, or a combination thereof communication information originating from the at least one user device.

* * * * *